United States Patent [19]
Murase

[11] Patent Number: 5,559,797
[45] Date of Patent: Sep. 24, 1996

[54] BURST SERVER STORED SWITCHING SYSTEM AND ITS METHOD

[75] Inventor: Tutomu Murase, Tokyo, Japan

[73] Assignee: NEC Corporation, Japan

[21] Appl. No.: 247,699

[22] Filed: May 23, 1994

[30] Foreign Application Priority Data

May 31, 1993 [JP] Japan .................................. 5-128566

[51] Int. Cl.$^6$ .................................................. H04L 12/58
[52] U.S. Cl. ............................................. 370/61; 370/94.1
[58] Field of Search ................................. 370/58.1, 58.2, 370/58.3, 53, 54, 60, 60.1, 61, 94.1

[56] References Cited

U.S. PATENT DOCUMENTS 4,058,672 11/1977 Crager et al. ............................. 370/61

OTHER PUBLICATIONS

Stallings, "Data and Computer Communications", 1988, Second Edition, pp. 198–199, 204.
IEEE Communications Society Reprint, "Fast Bandwidth Reservation Scheme with Multi–Link & Multi–Path Routing in ATM Networks", H. Suzuki et al, from IEEE Global Telecommunications Conference Dec. 2–5, 1991.

Primary Examiner—Welllington Chin
Assistant Examiner—Huy D. Vu
Attorney, Agent, or Firm—Laff, Whitesel, Conte & Saret, Ltd.

[57] ABSTRACT

The invention provides a packet transmission method and apparatus which prevent the holding of unavailable links during packet transmission. An embodiment of the present invention assumes that the case of a packet transmission between transmitting terminal x and receiving terminal y which includes seven of links 0 to 6 and switches 121 to 126. Switches 3 and 5 are provide burst server 101 and 102 respectively, which have a buffer for temporarily holding of a message packet and a function of the packet transmission. The function comprises to request a link reservation, to transmit message packet, to store the received message packet, to release the reserved links upon completing the transmission of message packet. When transmitting terminal x transmits a message packet, burst server 0 starts the packet transmission including the link reservation to burst server 1, and when the packet transmission is completed, reserved links 0, 1, 2 are released. The same packet transmission is repeated consecutively to each burst server until receiving terminal y if the link reservations are not blocked. If a link reservation is blocked at a link, the packet transmission is held the last burst server, and another link reservation is using the same bandwidth or converting the bandwidth to another available bandwidth.

8 Claims, 11 Drawing Sheets

BURST SERVER STORED SWITCHING SYSTEM AND ITS METHOD

BACKGROUND OF THE INVENTION

1. Field of the Invention

This invention relates to a packet switching system including an ATM (Asynchronous Transfer Mode).

2. Description of the Related Art

A switching system (Fast Reservation Protocol (FRP)) in an ATM or a packet switching system by which a bandwidth necessary for information transfer, that is, a transmission channel having an appropriate frequency is reserved prior to information transfer and, after the bandwidth is reserved, that is, after the necessary bandwidth is allocated, information is transferred in order to avoid overcrowding of the network is proposed as an FRP system in H. Suzuki et al. "Fast Bandwidth Reservation Scheme with Multilink & Multipath Routing in ATM Networks", IEEE INFOCOM 1991. The FRP system is described with reference to FIGS. 1 and 2. Link 0, link 1, link 2, link 3, link 4, link 5, and link 6 are connected in order from terminal x to terminal y as shown in FIG. 1, and for j=0, 1, 2, 3, 4, 5, switch j+1 is interposed between link j and link j+1. When information to be transmitted is produced, terminal x immediately sends out to link 0 a reservation request packet for reserving bandwidth B necessary for information transfer. Since link 0 may also possibly be used also for information transfer between terminal x and any other terminal than terminal y, if requested bandwidth B is not reserved (fails), link 0 returns a reservation failure packet to terminal x. When bandwidth B is reserved (succeeds), link 0 reserves bandwidth B and sends the reservation request packet to link 1. Bandwidth reservation is also attempted by link 1, link 2, link 3, link 4, and link 5 in a similar procedure to that performed by link 0. It is assumed that link 6 is fixed exclusively to terminal 6 and does not require reservation. When the bandwidth reservation gets through at all of the links from link 0 to link 5 so that a bandwidth is reserved from terminal x to terminal y, terminal x sends information to terminal y. On the other hand, if reservation fails even at only one link, a reservation failure packet is returned to terminal x from the link at which bandwidth reservation has failed. When reservation has failed, the bandwidth reservations from terminal x to the link are canceled and the reserved bandwidths are released. The failure corresponds to a so-called loss in a telephone network, and the probability of failure indicates the quality of the network. This failure is called a block, and the probability of failure is called the block rate. FIG. 2 shows an example of a diagram of transmission of control signals and information between transmitting terminal x and receiving terminal y when FRP communication is employed. FIG. 2 shows that the first block occurs at link 1; the second block occurs at link 4; and the third block occurs at link 2; thereafter, bandwidth reservation succeeds at all of links from link 1 to link 5 and information is transmitted.

In this instance, in the FRP system described above, if bandwidth reservation fails even at only one of the links from link 1 to link 4, the information is blocked irrespective of success or failure of reservation at any other link as shown in FIG. 2. Accordingly, the end to end block rate between transmitting and receiving terminals generally increases according to an increase in the number of links. For example, if it is assumed that the block probability at each link is independent of the block probability at any other links and is represented by g and the number of links to pass between the transmitting and receiving terminals is represented by K, the end to end block rate G is given by $G=1-(1-g)^K$ because it is a complementary event of the probability $(1-g)^K$ at which the reservation simultaneously succeeds at all of the links. For example, when g is 0.01 and K increases successively from 1, then G successively increases to approximately 0.01, 0.02 and 0.03. In a public telephone network scheme, since a value like 0.01 in the example mentioned above or 0.001 is used as g, G is approximated to G=Kg. Accordingly, when a large number of links must be passed, the block rate becomes very high, for example, in long-distance communications, the block rate increases resulting in a problem in that the communication quality is very low.

SUMMARY OF THE INVENTION

It is an object of the present invention to provide a packet transmission method and apparatus which reduce the occupation time of a link and which reduce the block rate to improve the flow of traffic of the entire network.

In order to attain the object described above, according to a first aspect of the present invention, there is provided a packet transmission method for a packet switching system wherein said method comprises the steps of:

providing at least one burst server interposed between a transmitting terminal and a receiving terminal through at least one link, said burst server having ability to store a received message packet, requesting reservation of a free link having the required bandwidth and sufficient storage capacity at the receiving side burst server and releasing the link after transmission of the message packet is completed;

performing the bandwidth reservation and receiving side storage capacity between the transmitting terminal and the closest burst server, between adjoining burst servers and between receiving terminal and its adjoining burst sever;

transmitting consecutively a message packet via interposed burst servers, and releasing consecutively the reserved links according to each completion of transmission of the message packet at the corresponding burst servers.

Another object of the invention is to provide a second method of a packet switching system comprising the steps of:

providing at least one burst server interposed between a transmitting terminal and a receiving terminal through at least one link when the terminals are separated by at least two links, said burst server having the ability to store received message packet, requesting reservation of free links having required bandwidth and sufficient storage capacity at the receiving side burst server and releasing the links after the transmission of the message packet is completed;

performing packet transmission which requires reservation of a necessary bandwidth through relevant links and receiving side storage capacity for the message packet from the transmitting terminal to a first burst server closest to the transmitting terminal;

storing the received message packet a said first burst server;

releasing the link between the transmitted terminal to the first burst server after transmitting the message packet;

performing said packet transmission for transmitting the stored message packet from the first burst server to the next burst server;

storing the received message packet at each burst server when the message packet is received;

repeating said packet transmission for consecutively transmitting the stored message packet to the next burst server until the message packet is received at the receiving terminal; and repeating the release of the link to the next burst server after the transmission of the message packet is completed at each burst server consecutively until the message packet is received at the receiving terminal.

A third object of this invention is to provide a method of packet transmission in a packet switching system wherein the method provides at least one burst server interposed between any transmitting terminal and its corresponding receiving terminal through at least one link when said terminals are separated by at least two links, said burst server having the ability to store a received message packet, requesting reservation of free links having the required bandwidth and sufficient storage capacity at the receiving side burst server and releasing the links after the transmission of the message packet is completed;

performing packet transmission which requires the reservation of a necessary bandwidth through relevant links and sufficient storage capacity for the message packet at the receiving side from the transmitting terminal to a furthest available burst server from the transmitting terminal until the reservation is obtained;

storing the received message packet at said furthest available burst server as the receiving side burst server;

releasing the link between the transmitting terminal to the furthest burst server after completing transmission of the message packet;

performing said packet transmission for transmitting the stored message packet from the furthest available burst server to a second furthest available burst server until the reservation is obtained;

storing the received message packet at each burst server when the message packet is received;

repeating the packet transmission for transmitting the stored message packet to the furthest burst server until the reservation is obtained consecutively until the message packet is received at the receiving terminal; and repeating the release of the link used for transmitting the message packet after completing transmission of the message packet at each concerned burst server consecutively until the message packet is received at the receiving terminal.

The first packet transmission method of the packet switching system as described above may include:

the burst servers being provided fixedly;

each of the burst server designating the next burst server to which received message packet is transmitted;

one of the burst servers which is connected to a subscriber exchange in which the transmitting terminal is accommodated having the step of designating the burst server to use;

restarting the request of reservation converting the required bandwidth another available bandwidth when the reservation of a link is blocked;

inquiring as to the storage capacity of the receiving side burst server at the request of the reservation is performed using a bandwidth reservation request packet; and notifying the current receiving storage capacity at least to the adjoining burst servers so that they can recognize the current receiving storage capacity without liquiry.

A further object of the invention is to provide a packet transmission apparatus of a packet switching system providing:

at least one burst server interposed between a transmitting terminal and a receiving terminal through at least one link when the terminals are separated by at least two links, said burst server comprising:

means for performing packet transmission which requires reservation of a necessary bandwidth through relevant links and sufficient storage capacity for the message packet at the next burst server;

means for storing the received message packet; and means for releasing the links which is used for transmitting after the completion of transmission of the message packet.

A second packet transmission apparatus of a packet switching system is to provide at least one burst server interposed between a transmitting terminal and a receiving terminal through at least one link when the terminals are separated by at least tow links, said burst server comprising:

means for performing packet transmission which requires the reservation of a necessary bandwidth through relevant links and sufficient storage capacity for the message packet at a receiving server between the transmitting server and the furthest available burst server which is first blocked;

means for storing the received message packet; and means for releasing the link used for transmitting the message packet when the transmission of the message packet is completed at the burst server.

The packet transmission apparatuses described above may include:

means for designating the next burst server based on the place of the switch in which the receiving terminal is accommodated;

the burst server accommodating the transmitting terminal comprises means for designating the burst server to be used based on the place of the switch in which the receiving terminal is accommodated;

the burst server comprising means for converting the bandwidth to another available bandwidth and restarting to make the reservation for the converted bandwidth when the former reservation is blocked;

the link reservation being requested by using a bandwidth reservation request packet; and the burst server further comprising means for notifying the current storage capacity of at least adjoining burst servers so that they can recognize the current storage capacity without inquiry.

BRIEF DESCRIPTION OF THE DRAWINGS

FIG. 13 is a diagram showing the sequence of transmission in a second embodiment in which the reservation request from a certain burst server to the next burst server is started before packet transmission to the certain burst server comes to an end.

DESCRIPTION OF THE PREFERRED EMBODIMENTS

Embodiments of the present invention are described below with reference to the drawings.

Figure 1:
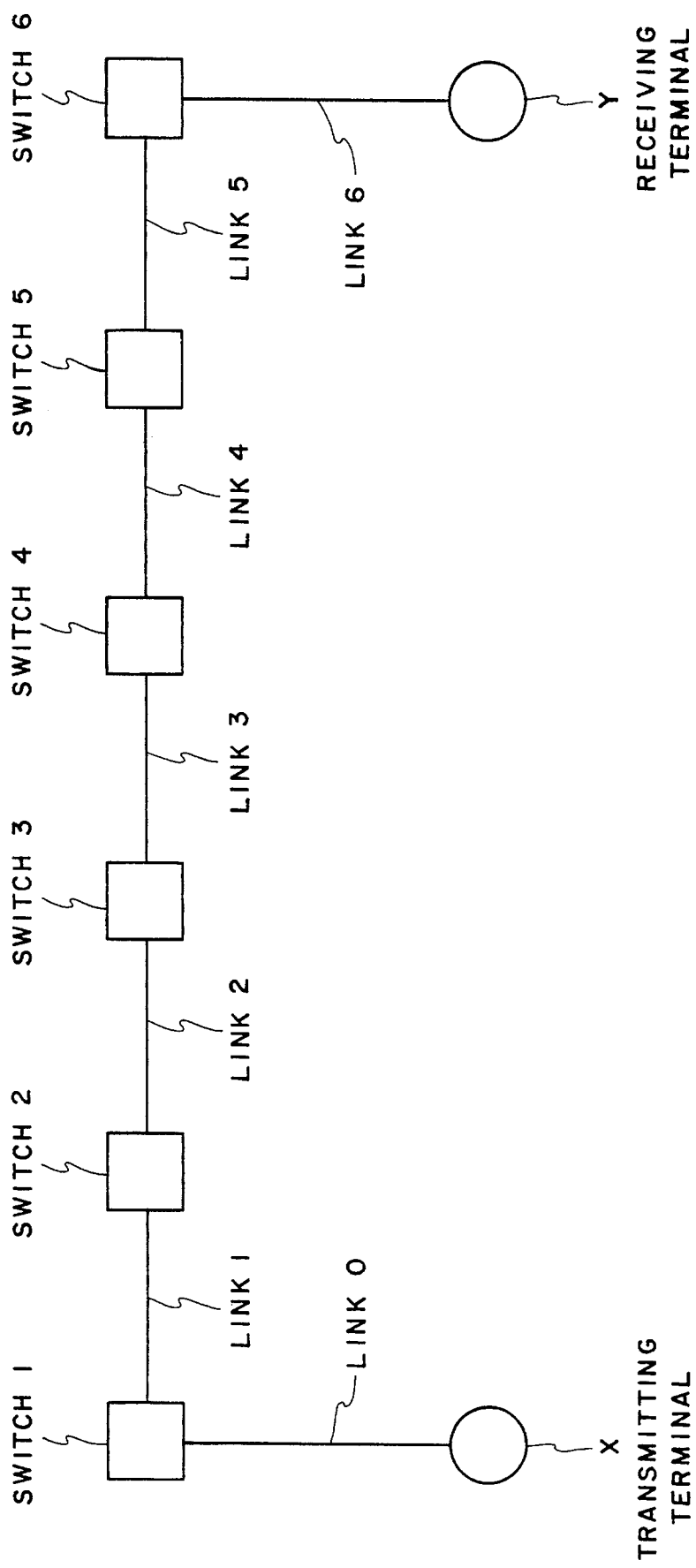
FIG. 1 is a block diagram showing the construction of a packet transmission apparatus of a conventional packet switching system.
Figure 2:
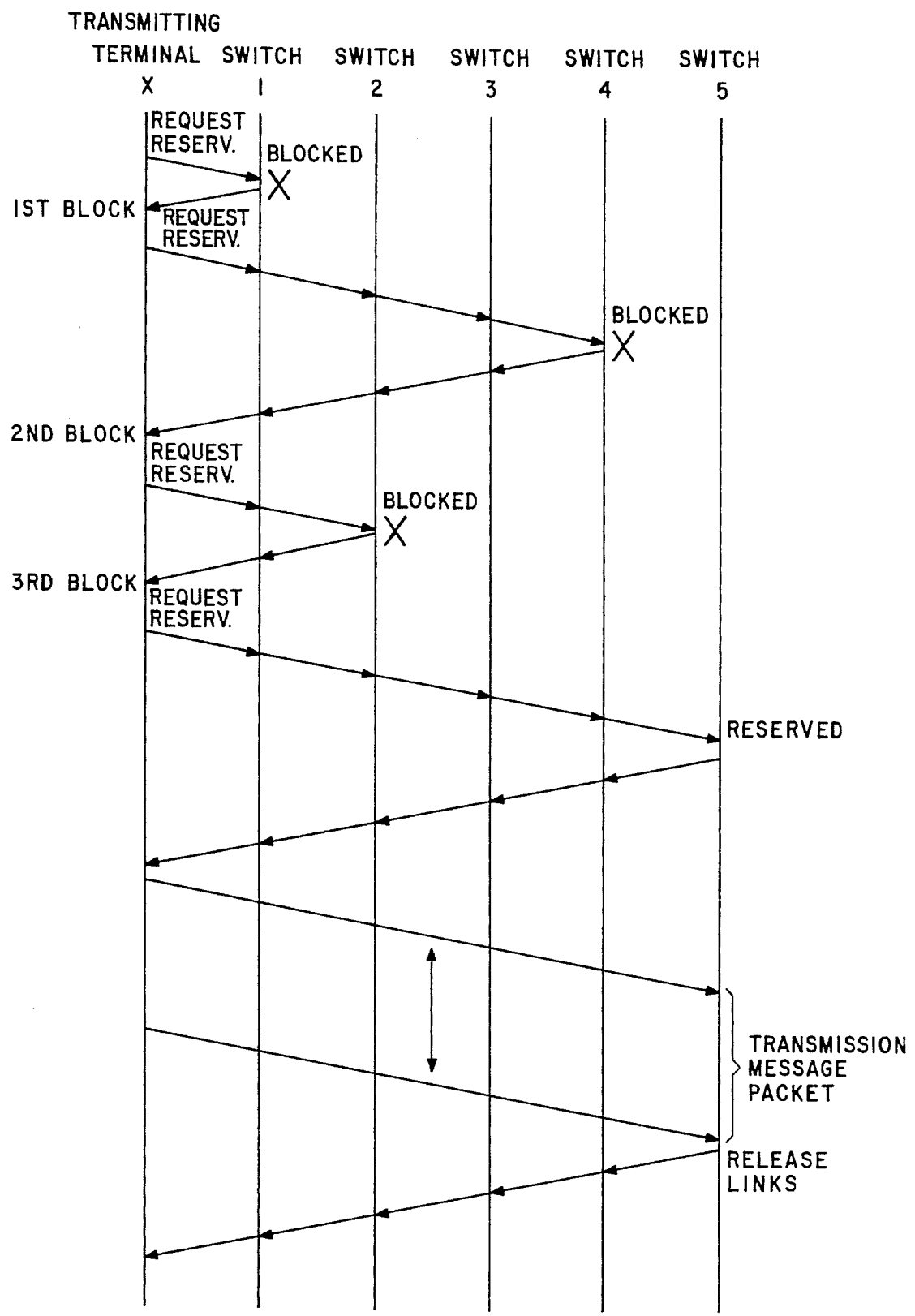
FIG. 2 is a sequence chart of packet transmission in the conventional example shown in FIG. 1.
Figure 3:
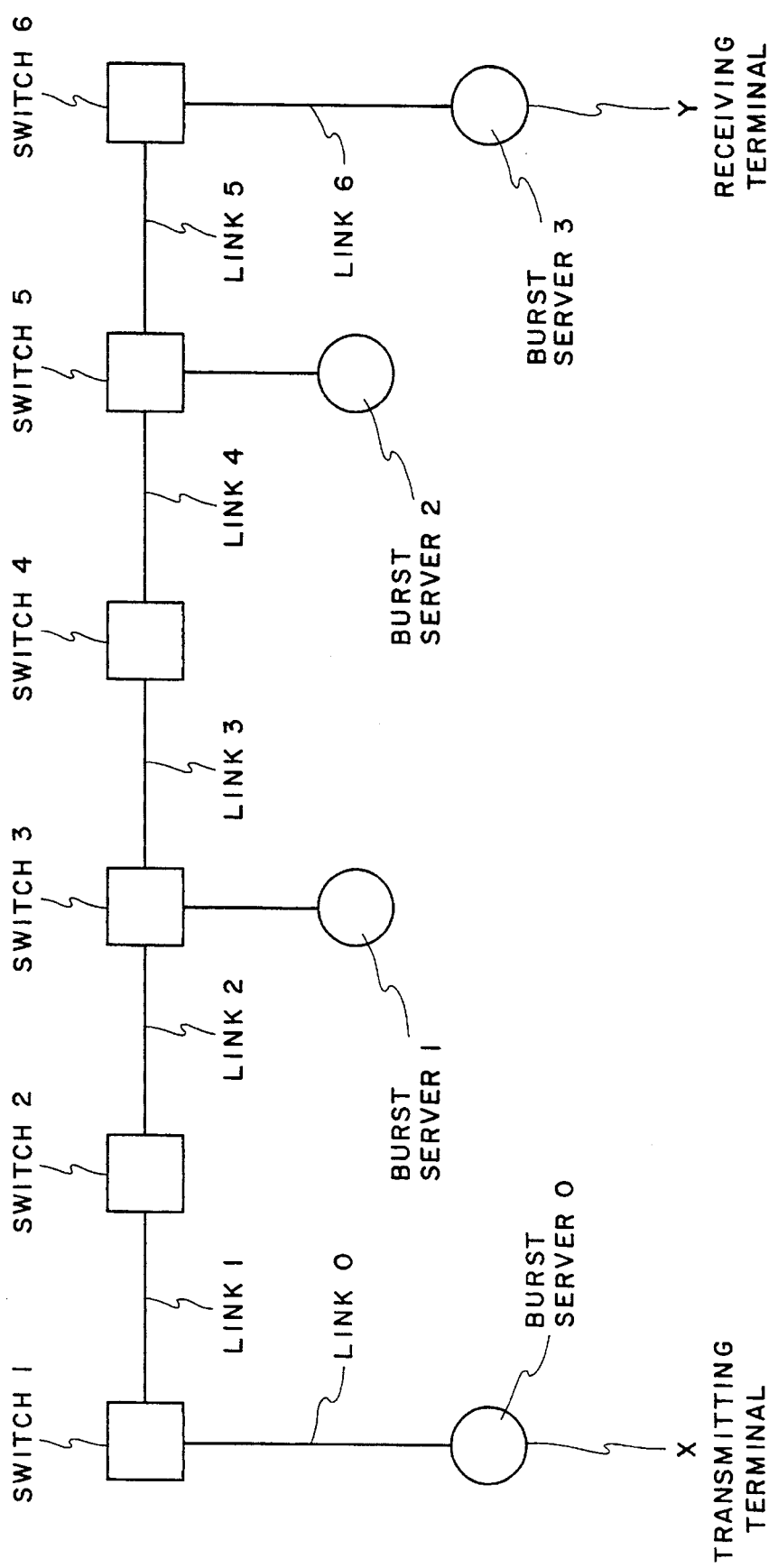
FIG. 3 is a block diagram showing an embodiment of the arrangement of relay apparatus of a packet transmission apparatus to which the packet transfer method for the packet switching system of the present invention is applied.

FIG. 3 is a block diagram showing the arrangement of intermediate apparatuses of packet transmission with the packet switching system of the present invention. Any intermediate apparatus in the present embodiment is called a burst server.

For the convenience of description, burst server 0 serves as transmitting terminal x, and burst server 3 serves as receiving terminal y. Link 0, switch 1, link 1, switch 2, link 2, switch 3, link 3, switch 4, link 4, switch 5, link 5, switch 6 and link 6 are connected between transmitting terminal x and receiving terminal y, and burst server 0 is connected to switch 1; burst server 1 is connected to switch 3; burst server 2 is connected to switch 5; and burst server 3 is connected to switch 6.

In the following description, it is assumed that the route of communication between the transmitting and receiving terminals is determined in advance for simplified description. However, the present invention can be applied similarly to another routing mode wherein the route of communication is not determined in advance but is determined by performing bandwidth reservation. It is assumed that each burst server knows in advance the serial order of links and burst servers to be passed on the route. For example, each burst server may have a list of links and burst servers to be passed as a routing table.

Figure 6:
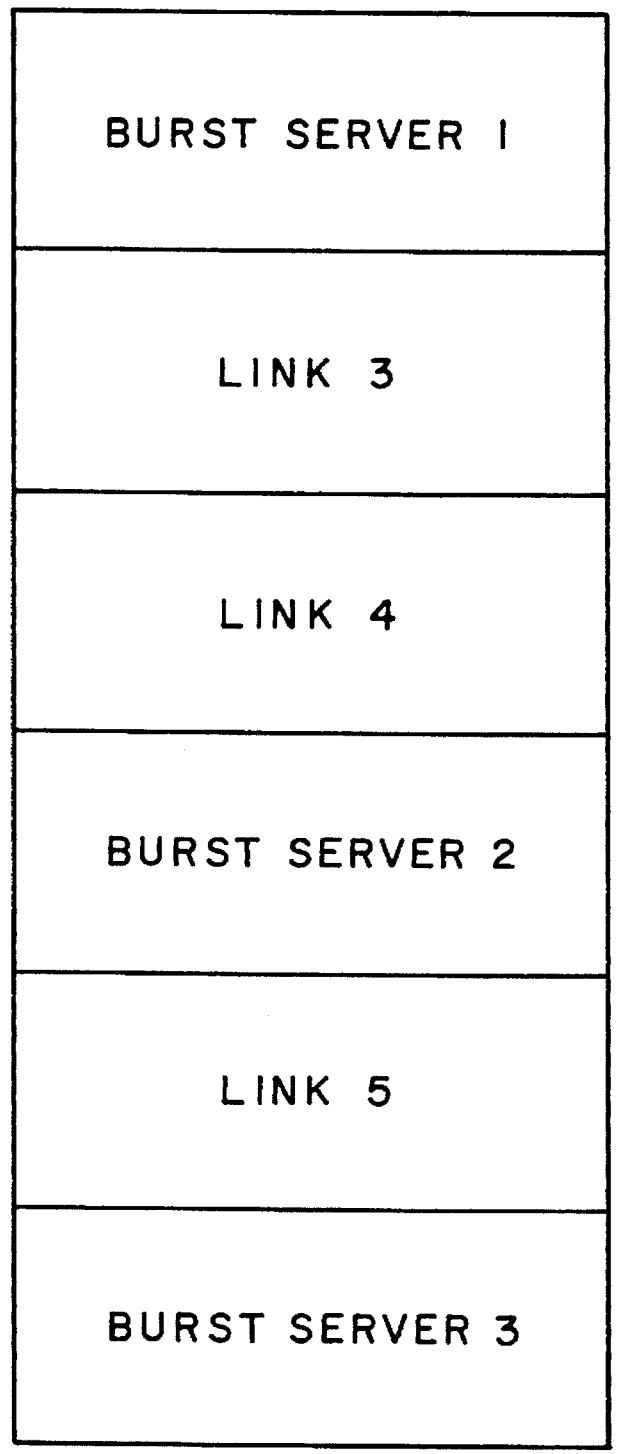
FIG. 6 is a diagram showing a routing table.

FIG. 6 shows an example of a table provided in by burst server 1. Meanwhile, it is possible to write the names of links and burst servers through which a reservation packet has passed upon bandwidth reservation into a routing region of a packet payload.

Figure 7:
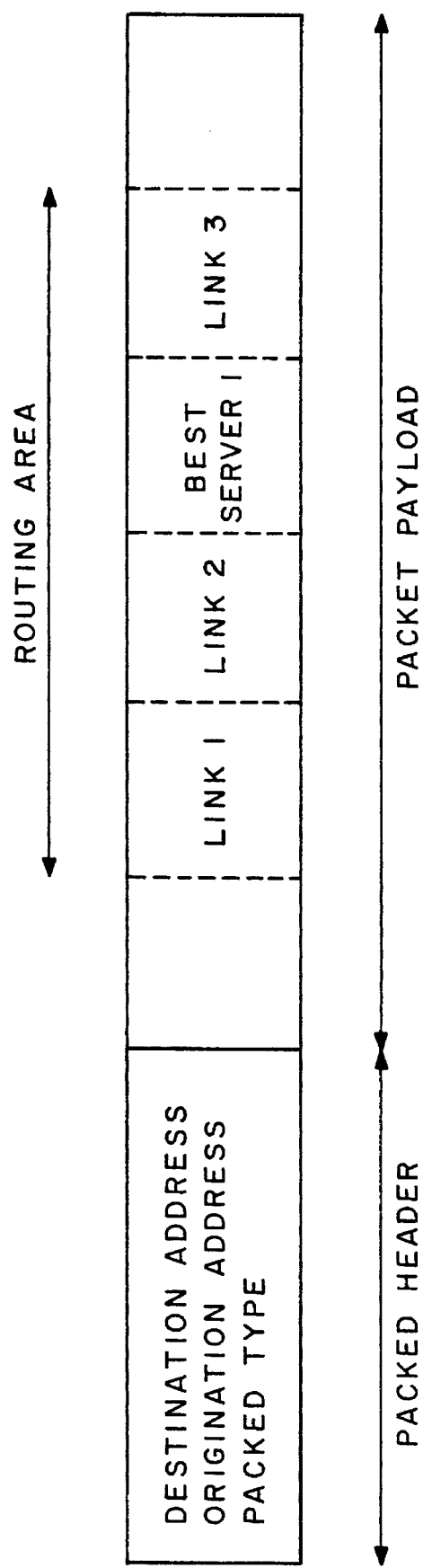
FIG. 7 is a diagram showing a control packet.

FIG. 7 is a diagram showing an example of the contents of the routing region of a reservation packet described above when the packet is transmitted from link 3 toward link 4 from burst server 0. Referring to FIG. 7, the destination of the packet, the transmitting terminal of the packet and the type of packet are described in the header, and the routing region is included as one of the regions in the packet payload. In the routing region, the names of links, switches and burst servers through which the packet has passed are described according to the order it passed. In the example of FIG. 7, it is shown that the packet has passed through link 1, link 2, burst server 1 and link 3 sequentially.

Figure 8:
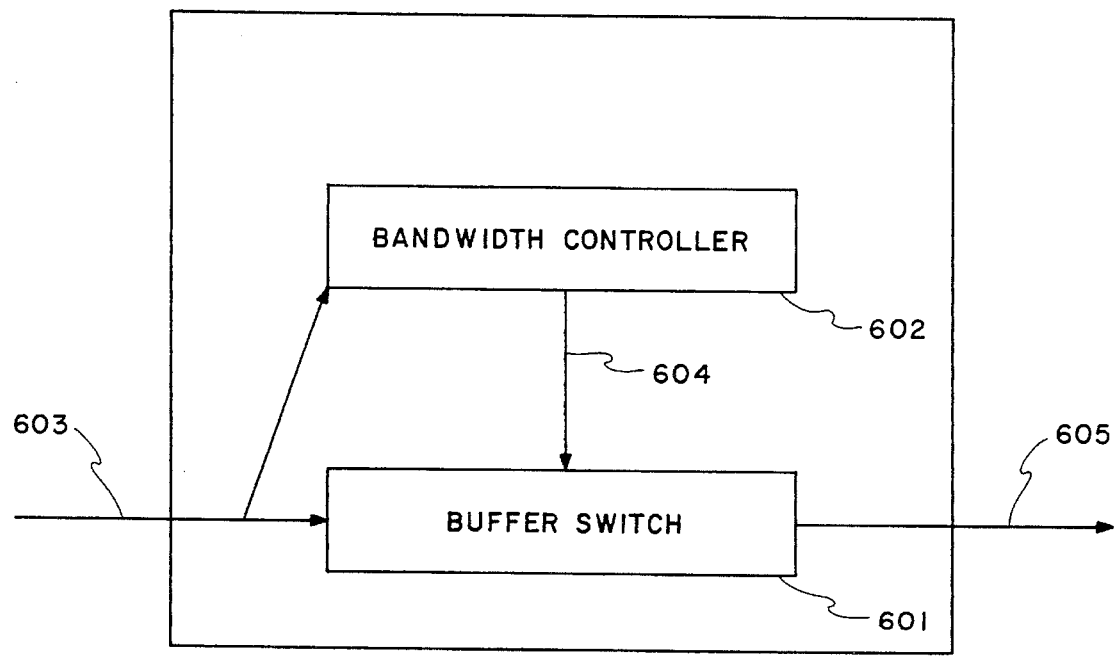
FIG. 8 is a block diagram showing the construction of an exchange switch of each node.

Each switch includes, as shown in FIG. 8, buffer switch 601 for a packet switching function similar to that of a common ATM switch, and bandwidth control apparatus 602. A bandwidth reservation packet is inputted from input line 603 to bandwidth control apparatus 602, and bandwidth control apparatus 602 has the functions of producing a control packet such as a bandwidth reservation packet, a bandwidth reservation failure packet, a bandwidth cancel packet and a bandwidth release packet, producing a packet header so that the control packet may be sent to an adjacent burst server or an adjacent switch through a link, and inputting the packet header to buffer switch 601 through signal line 604. Buffer switch 601 has the functions of directing the packet to the destination written in the header of the packet and outputting the message packet and the control packet to the relevant destination through output line 605.

Figure 9:
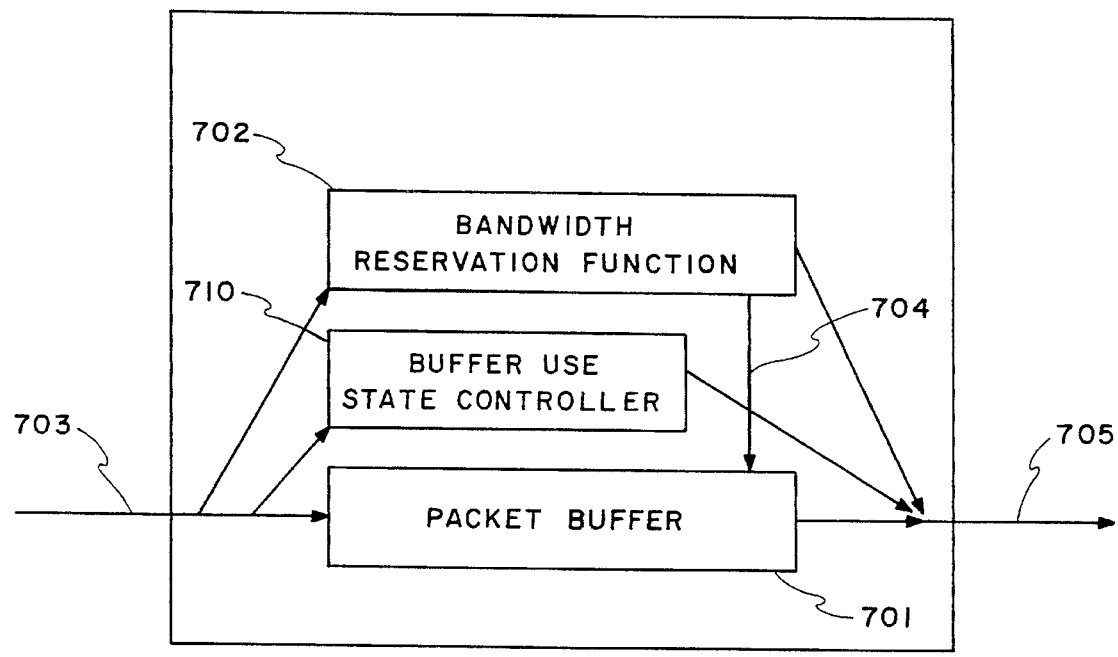
FIG. 9 is a block diagram showing the construction of a burst server.

Each burst server comprises packet buffer 701 for storing information, buffer use state control apparatus 710, and bandwidth reservation function 702 as shown in FIG. 9. Packet buffer 701 stores message packet supplied through input line 703 and sends out, when an outputting instruction is received from bandwidth reservation function 702 through signal line 704, the message packet through output line 705 in order to send the message packet to the relevant destination. Buffer use state control apparatus 710 always supervises the use state of the buffer and holds such use state as the free capacity of the buffer, increasing the rate of the used area of the buffer and the degree exceeding a predetermined capacity. Buffer use state control apparatus 710 determines, in the present embodiment, when a bandwidth reservation packet inquires whether the burst server is available or not, the possibility of allotting free buffer capacity necessary for message packet transfer requested by the reservation packet and answer for the packet. However, it is otherwise possible to employ another control wherein, when the free capacity of the buffer is insufficient, buffer use state control apparatus 710 sends a server use suspension packet to the other burst servers and terminals in the network, and then when the free capacity of the buffer becomes sufficient, buffer use state control apparatus 710 sends a server restoration packet to the other burst servers and terminals in the network, whereby it becomes possible to respond to an incoming reservation request packet. The answer of possibility to use of the buffer is based on the determination whether the free capacity of the buffer is sufficient, is judged in the present embodiment, in terms of whether the free capacity of the buffer is greater than the maximum size of the message packet to be transmitted. However, it is otherwise possible to employ another method wherein the size of the information to be transmitted is described into the bandwidth reservation packet and then compared with the free capacity of the buffer. Bandwidth reservation function 702 receives a control packet such as a reservation packet, a reservation failure packet, a bandwidth cancel packet or a bandwidth release packet through input line 703, performs corresponding processing which is hereinafter described, produces a control packet corresponding to the inputted packet, and sends out the control packet to an adjacent switch or burst server through output line 705. When information to be transmitted is stored in packet buffer 701, the burst server works like a transmitting terminal. In this instance, bandwidth reservation function 702 sends out the control packet through output line 705 so that the bandwidth required for the message packet is reserved up to the burst server which is accommodating the receiving terminal. Further, when a bandwidth reservation success packet is received, bandwidth reservation function 702 controls packet buffer 701 so that the information in packet buffer 701 is sent out to the relevant destination.

The bandwidth of link f, where f=1, 2, 3, 4, 5, is controlled by the bandwidth control apparatus of switch f. Further, for simplified description, it is assumed that link 0 and link 6 require no bandwidth control and no bandwidth reservation because they can be used exclusively by burst server 0 and burst server 3, respectively, or bandwidth reservation succeeds without fail at link 0 and link 6.

The first embodiment is described with reference to FIG. 3. The first embodiment is a system wherein message packet is transmitted step by step between burst servers.

Burst server 0 sends to link 1 a bandwidth reservation packet which requests to reservation of a required bandwidth at all links on the route to burst server 1. Upon reception of the bandwidth reservation request packet, switch 1 describes, when the requested bandwidth is greater than the remaining bandwidth held in link 1, into the reservation requesting packet that the reservation has failed at link 1, and rewrites the packet header into another packet header of the type which indicates a reservation failure packet, whereupon it sends the reservation failure packet back to burst server 0. In this instance, since a block has occurred, burst server 0 performs another request for reservation.

On the other hand, if the requested bandwidth is equal to or smaller than the remained bandwidth held in link 1, the bandwidth control apparatus of switch 1 allocates the requested bandwidth and subtracts the requested bandwidth from the remaining bandwidth. Switch further sends the packet to link 2. When the reservation request packet is received by switch 2, the bandwidth control apparatus of switch 2 describes, if the requested bandwidth is greater than the remaining bandwidth of switch 2, into the reservation request packet that the reservation has failed at link 2, and rewrites the packet header into another packet header of the type which indicates a reservation failure packet, whereupon it sends the reservation failure packet back to burst server 0. When the reservation failure packet is received, switch 1 releases the reserved bandwidth of link 1. In this instance, since a block has occurred, burst server 0 performs another request for reservation.

On the other hand, if the reservation request bandwidth is equal to or smaller than the remaining bandwidth held in link 2, the bandwidth control apparatus of switch 2 allocates the requested bandwidth and subtracts the requested bandwidth from the remained bandwidth. Further, switch 2 sends the packet to burst server 1.

Burst server 1 confirms from the arrival of the bandwidth reservation packet that the reservation at link 1 and link 2 has succeeded. Further, when buffer use state control apparatus 710 of burst server 1 indicates the permission of use, burst server 1 sends a reservation success packet back to burst server 0. Upon reception of the reservation success packet, burst server 0 sends the message packet to burst server 1. After the message packet is send out, burst server 0 sends a link reservation release packet to all of the links up to burst server 1. The bandwidth control apparatus of switch 1 and switch 2 returns the bandwidth, which has been used by the message packet, as a free bandwidth to the remaining bandwidths. On the other hand, when buffer use state control apparatus 710 of burst server 1 indicates rejection of use, the bandwidth control apparatus of burst server 1 describes into the bandwidth reservation request packet that the reservation has failed at burst server 1, and rewrites the packet header as a reservation failure packet, and sends the reservation failure packet back to burst server 0. Upon receiving the reservation failure packet, since a block has occurred, burst server 0 performs another request for reservation.

Thereafter, the procedure described above is repeated in which burst server 1 acts as burst server 0; link 3 acts as link 1; link 4 acts as link 2; switch 3 acts as switch 1; and switch 4 acts as switch 2. In particular, burst server 1 sends to link 3 a bandwidth reservation request packet which requests to reservations of a required bandwidth at all of the links on the route up to burst server 2. The bandwidth control apparatus of switch 3 having received the bandwidth reservation request packet describes, when the requested bandwidth is greater than the remaining bandwidth of link 3, into the bandwidth reservation requesting packet that the reservation has failed at link 3, and rewrites the packet header as a reservation failure packet, and sends the reservation failure packet back to burst server 1. Upon receiving the reservation failure, since a block has occurred, burst server 1 performs another request for reservation.

On the other hand, when the requested bandwidth is equal to or smaller than the remaining bandwidth of link 3, the bandwidth control apparatus of switch 3 allocates the requested bandwidth and subtracts the requested bandwidth from the remaining bandwidth. Further, switch 3 sends the packet to link 4. The bandwidth control apparatus of switch 4 having received the reservation packet describes, when the requested bandwidth is greater than the remaining bandwidth of link 4, into the requesting packet that the reservation has failed at link 4, and rewrites the packet header as a reservation failure packet, and sends the reservation failure packet back to burst server 1. When the reservation failure packet is received, switch 3 releases the reserved bandwidth of link 3. In this instance, since a block has occurred, burst server 1 performs another request for reservation.

On the other hand, when the requested bandwidth is equal to or smaller than the remaining bandwidth of link 4, the bandwidth control apparatus of switch 4 allocates the requested bandwidth and subtracts the requested bandwidth from the remaining bandwidth. Further, switch 4 sends the packet to burst server 2.

Burst server 2 confirms from the arrival of the bandwidth reservation packet that the reservation at link 3 and link 4 has succeeded. Further, when buffer use state control apparatus 710 of burst buffer 2 indicates permission of use, burst server 2 sends a reservation success packet back to burst server 1. Upon receiving the reservation success packet, burst server 1 sends the message packet to burst server 2. After the message packet is sent out, burst server 1 sends a link reservation release packet to all of the links up to burst server 2. The bandwidth control apparatus of switch 3 and switch 4 returns the bandwidth, which has been used by the message information, as a free bandwidth to the remaining bandwidths of link 3 and link 4, respectively. On the other hand, when buffer use state control apparatus 710 of burst server 2 indicates rejection of use, burst server 2 describes into the requesting packet that the reservation has failed at burst server 2, and rewrites the packet header as a reservation failure packet, and sends the reservation failure packet back to burst server 1. Upon receiving the reservation failure packet, since a block has occurred, burst server 1 performs another request for reservation.

Thereafter, burst server 2 sends to link 5 a bandwidth reservation request packet which requests reservation of a required bandwidth at all of the links on the route up to burst server 3. When switch 5 receives the bandwidth reservation packet, if the requested bandwidth is greater than the remaining bandwidth of link 5, the bandwidth control apparatus of switch 5 describes into the bandwidth reservation requesting packet that the reservation has failed at link 5, and rewrites the packet header as a reservation failure packet, and sends the reservation failure packet back to burst server 2. Upon receiving the reservation failure packet, since a block has occurred, burst server 2 performs another request for reservation.

On the other hand, when the requested bandwidth is equal to or smaller than the remaining bandwidth of link 5, the bandwidth control apparatus of switch 5 allocates the requested bandwidth and subtracts the requested bandwidth from the remaining bandwidth. Further, switch 5 sends the packet to burst server 3.

Burst server 3 confirms from the arrival of the bandwidth reservation packet that the reservation at link 5 has succeeded. Further, when buffer use state control apparatus 710 of burst buffer 3 indicates permission of use, burst server 3 sends a reservation success packet back to burst server 2. Upon reception of the reservation success packet, burst server 2 sends the message packet to burst server 3. After the message packet is sent out, burst server 2 sends a link reservation release packet to all of the links up to burst server 3. The bandwidth control apparatus of switch 5 returns the bandwidth, which has been used for the message packet, as a free bandwidth to the remaining bandwidth of link 5. On the other hand, when buffer use state control apparatus 710 of burst server 3 indicates rejection of use, burst server 3 describes into the bandwidth reservation request packet that the reservation has failed at burst server 3, and rewrites the packet header as a reservation failure packet, and sends the reservation failure packet back to burst server 2. Upon receiving the reservation failure packet, since a block has occurred, burst server 2 performs another request for reservation.

Figure 4:
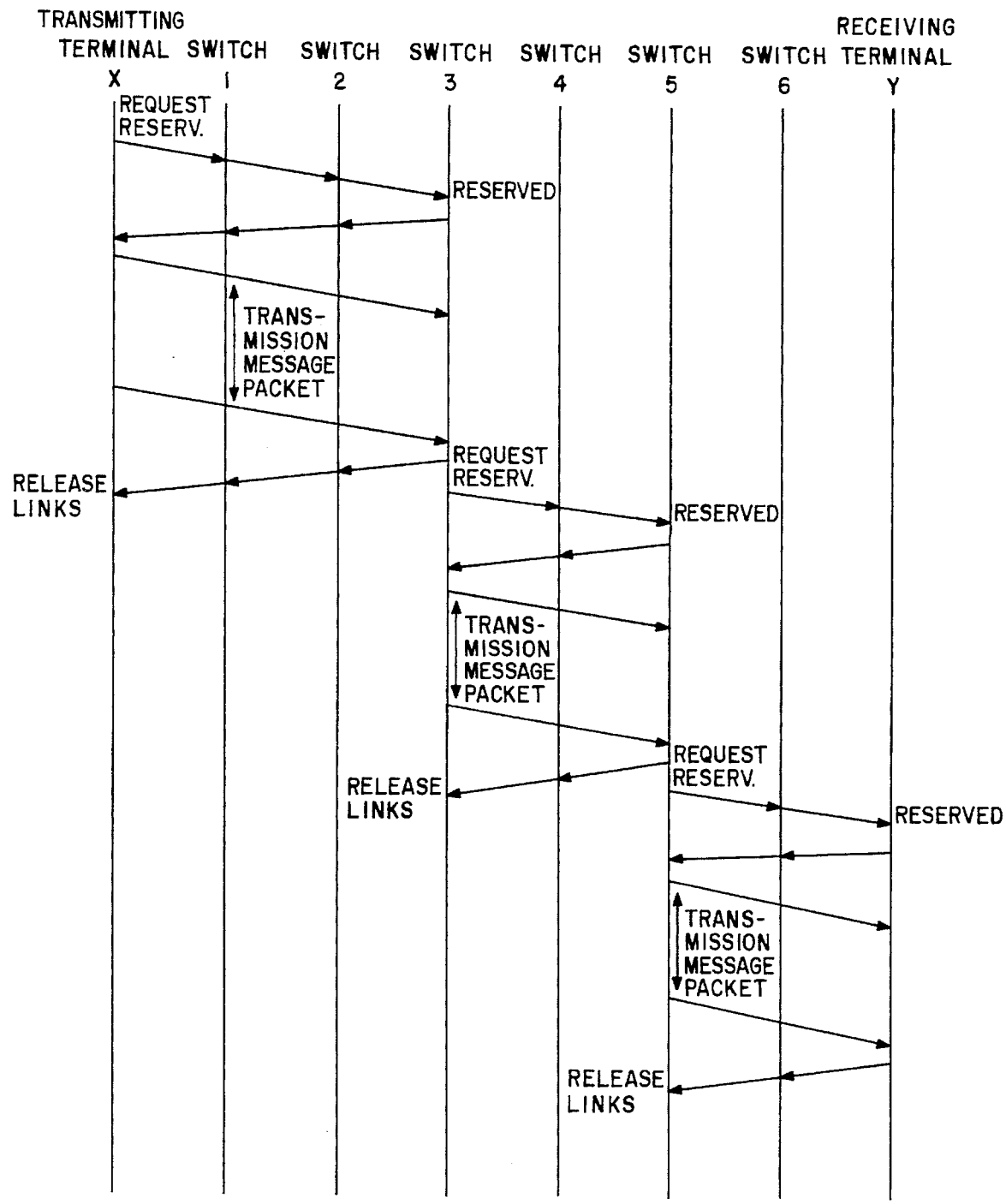
FIG. 4 is a sequence chart of packet transmission in the packet transmission apparatus shown in FIG. 3.

FIG. 4 is a signal sequence chart illustrating that burst server 3 receives information from burst server 0 as a result of the sequence of operations described above.

A second embodiment according to the present invention is described with reference to FIG. 3. The second embodiment is a system wherein it is attempted to complete reservation up to the furthest available burst server until reservation of a link succeeds, but when the reservation fails, message packet is sent to the burst server just prior to the link at which reservation has failed, and the procedure is repeated by the burst server.

A burst server which has received message information to be transmitted is called as transmitting server. Initially, burst server 0 is the source server. On the other hand, a burst server at a destination where a message information is sent is called a receiving server. The receiving server is fixed to burst server 3 in this embodiment.

The following procedure is recursively repeated to transmit message packet to the receiving server.

The transmitting server sends to the receiving server a bandwidth reservation request packet which requests reservation of a required bandwidth at all of the links on the route from the transmitting server to the receiving server.

In switch j (j=1, 2, 3, 4) which has received the bandwidth reservation request packet, the bandwidth control apparatus allocates the requested bandwidth and subtracts the requested bandwidth from the remaining bandwidth of link j if the requested bandwidth is equal to or smaller than the remaining bandwidth. Further, switch j sends the packet to link j+1.

In switch 5 which has received the bandwidth reservation request packet, the bandwidth control apparatus allocates the requested bandwidth and subtracts the requested bandwidth from the remaining bandwidth of switch 5 if the requested bandwidth is equal to or smaller than the remaining bandwidth of link 5. Burst server 3 thus describes into the bandwidth reservation request packet that the reservation has succeeded at the links up to the receiving server, and sends a reservation success packet to the transmitting server. The transmitting server which has received the reservation success packet sends message packet to the receiving server from which the reservation success packet has been transmitted. After the message packet is sent out, the transmitting server sends a link reservation release packet to all of the links up to the receiving server. The bandwidth control apparatus in each switch j (j=1, 2, 3, 4, 5) returns to the remaining bandwidth of link j the bandwidth which has been used for the transmission of the message packet.

In switch j (j=1, 2, 3, 4, 5) which has received the bandwidth reservation request packet, when the requested bandwidth is greater than the remaining bandwidth of link j, the bandwidth control apparatus describes into the bandwidth reservation request packet that the reservation has failed at link j, and rewrites the packet header as a reservation failure packet, and sends the reservation failure packet back to the burst server (hereinafter referred to as a tentative receiving server) positioned just prior to the link at which the reservation has failed. For instance, when link 1 or link 2 is the reservation failure link, the reservation failure packet is sent to burst server 0; when link 3 or link 4 is the reservation failure link, the reservation failure packet is sent to burst server 1; and when link 5 is the reservation failure link, the reservation failure packet is sent to burst server 2.

When switch k receives a reservation failure packet, the bandwidth control apparatus of switch k which controls link k returns the bandwidth which is reserved for the bandwidth reservation request packet to the remaining bandwidth of link k, and cancels the reservation.

When the tentative receiving server which received the reservation failure packet is the transmitting server, since a reservation block has occurred, the transmitting server repeats the procedure described above after waiting a predetermined time.

By contrast, when the tentative receiving server which receives the reservation failure packet is not the transmitting server, the tentative receiving receiver having received the reservation failure packet describes, when buffer use state control apparatus 710 of the tentative receiving server indicates permission of use, into the reservation failure packet that the reservation has succeeded at the links up to the tentative receiving server, and rewrites the packet header of the reservation failure packet as a reservation success packet, and sends the reservation success packet to the transmitting server. On the other hand when buffer use state control apparatus 710 of the tentative receiving server indicates rejection of use, the tentative receiving buffer sends the reservation failure buffer back to the transmitting server. Upon receiving the reservation failure packet, since a block has occurred, the transmitting server again repeats the procedure described above.

The transmitting server having received the reservation success packet sends message packet to the tentative receiver server. After the message packet is sent out, the transmitting server sends a link reservation release packet to all of the links up to the tentative receiving server. The bandwidth control apparatus of each switch j (j=1, 2, 3, 4, 5) returns the bandwidth which has been used for the transmission of message packet as a free bandwidth to the remaining bandwidth of link j. Further, in this instance, since the message packet is received by the tentative receiving server, the procedure described above is repeated by the tentative receiving server because the tentative receiving server now acts as a transmitting server.

Figure 5:
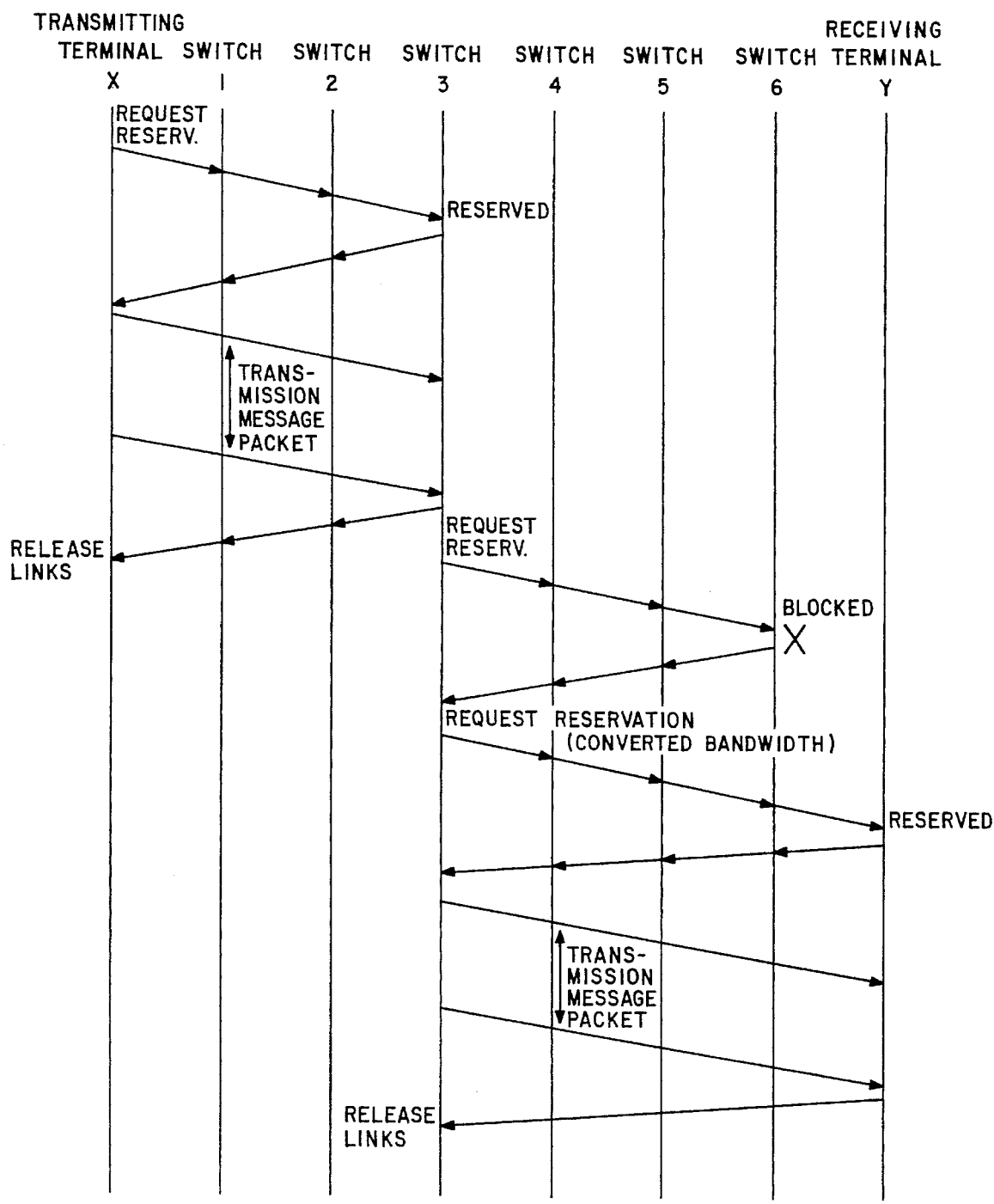
FIG. 5 is a sequence chart including re-starting of transmission after a change of the packet bandwidth when a block occurs with the packet transmission apparatus shown in FIG. 3.

For example, if each of links 1, 2, 3 and 5 has sufficient remaining bandwidth for reserving a requested bandwidth but only link 4 temporarily has insufficient remaining bandwidth, the procedure is modified as follows. Burst server 0 first attempts and succeeds to make a reservation for link 1 using a bandwidth reservation packet and then attempts and succeeds to make a reservation for link 2, whereafter it attempts and succeeds to make a reservation for link 3 and then attempts to make a reservation for link 4. The reservation unfortunately fails to be made at link 4, and a reservation failure packet is sent to burst server 1 and the reservation at link 3 is also canceled. Burst server 1 now serves as a tentative receiving server, and burst server 0 and burst server 1 transmit message packet using the reserved bandwidths of links 1 and 2. Thereafter, burst server 1 attempts to make reservation of a link using a bandwidth reservation request packet. Fortunately, if the reservation for link 4 succeeds, burst server 1 then attempts and succeeds to make reservation for link 5. In this instance, the bandwidth reservation request packet arrives at burst server 3, and a reservation success packet is sent from burst server 3 to burst server 1. Consequently, burst server 1 and burst server 3 transmit message packet using the reserved bandwidths of links 1 and 2. A sequence chart of communication of the example described above is shown in FIG. 5.

Further, in the first and second embodiments described above, if the buffers have sufficient capacity, it is possible to modify the construction of the switches and burst servers eliminating buffer use condition control apparatus 710 and the procedure of inquiring as to availability of the buffers of the burst servers. The modified construction operates similarly to the constructions of the first and second embodiments when each buffer in the first and second embodiments is always in an enabled condition so that it can be used at any time.

Further, in the first and second embodiments described above, all of the burst servers on the route need not necessarily be used, and it is otherwise possible to employ the construction wherein only a limited numbers of burst servers are used in accordance with the determination of a terminal or the network.

Figure 10:
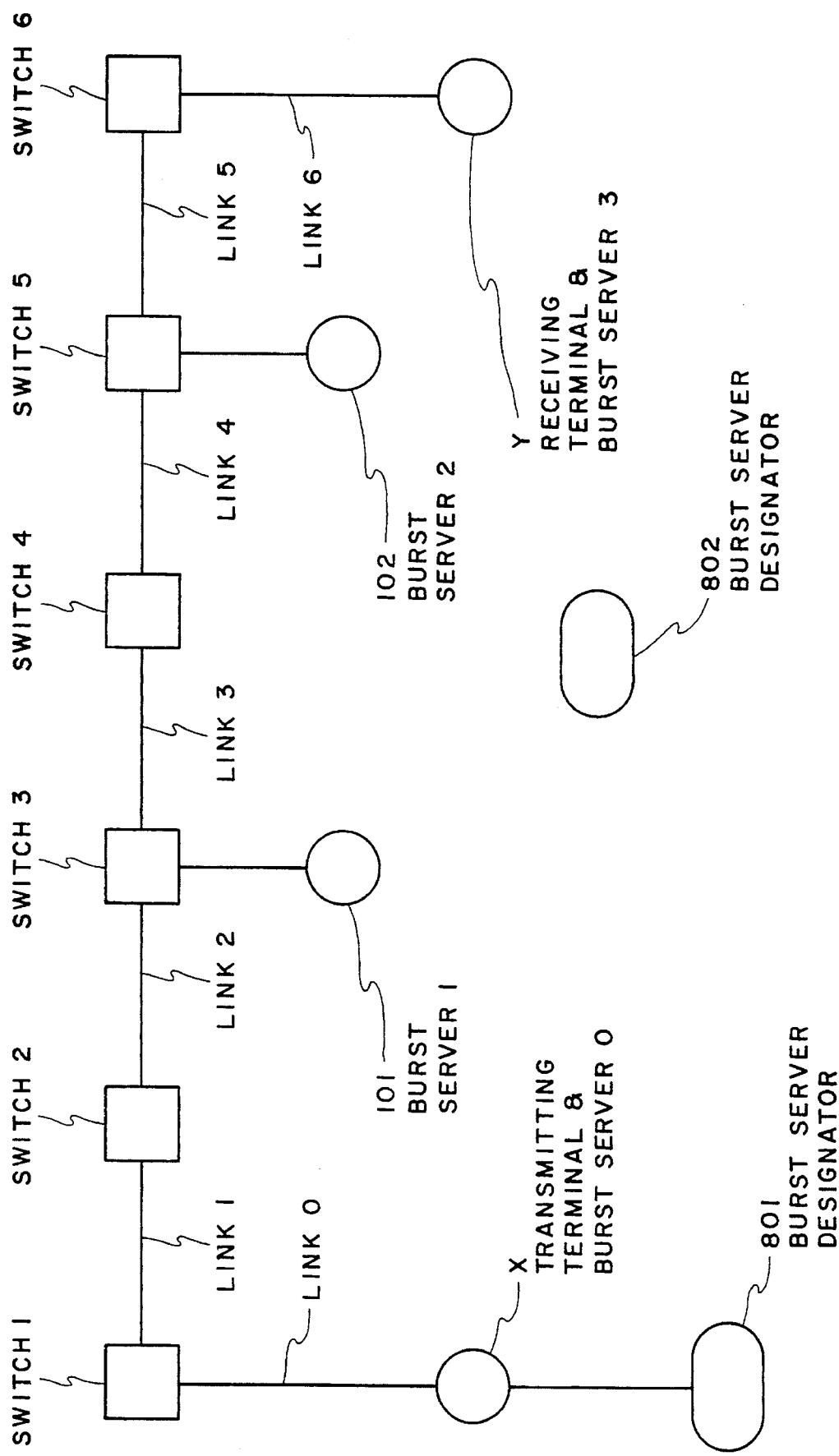
FIG. 10 is a block diagram showing the network construction in which a terminal and the network have a burst server selecting function.

It is also possible to employ the construction wherein a transmitting source additionally has a selecting function for selecting a burst server or servers to be limited as described above. Further, it is also possible to employ a construction wherein the selecting function for selecting a burst server is provided in the network. The selecting function determines a burst server using variable information such as the load condition of the network and structural information such as the number of links between the transmitting and receiving terminals. FIG. 10 shows an example of a construction wherein selecting function 801 is additionally provided for the transmitting terminal and another example of the construction wherein selecting function 802 is provided in the network. In the examples shown in FIG. 10, selecting function 801 placed in the terminal has the procedures of selecting burst servers to be used from the number of links between the transmitting and receiving terminals and of selecting a number of burst servers equal to or smaller than one third the number of links at random from all of the burst servers on the route between the transmitting and receiving terminals.

It is to be noted that, while a burst server operates as a part of the network functions such as a switch or a link in the embodiments described above, a construction wherein a burst server is operated independently of the network and a construction wherein some burst servers act as part of the network functions and other burst servers act independently from the network in a mixed condition are possible.

Figure 11:
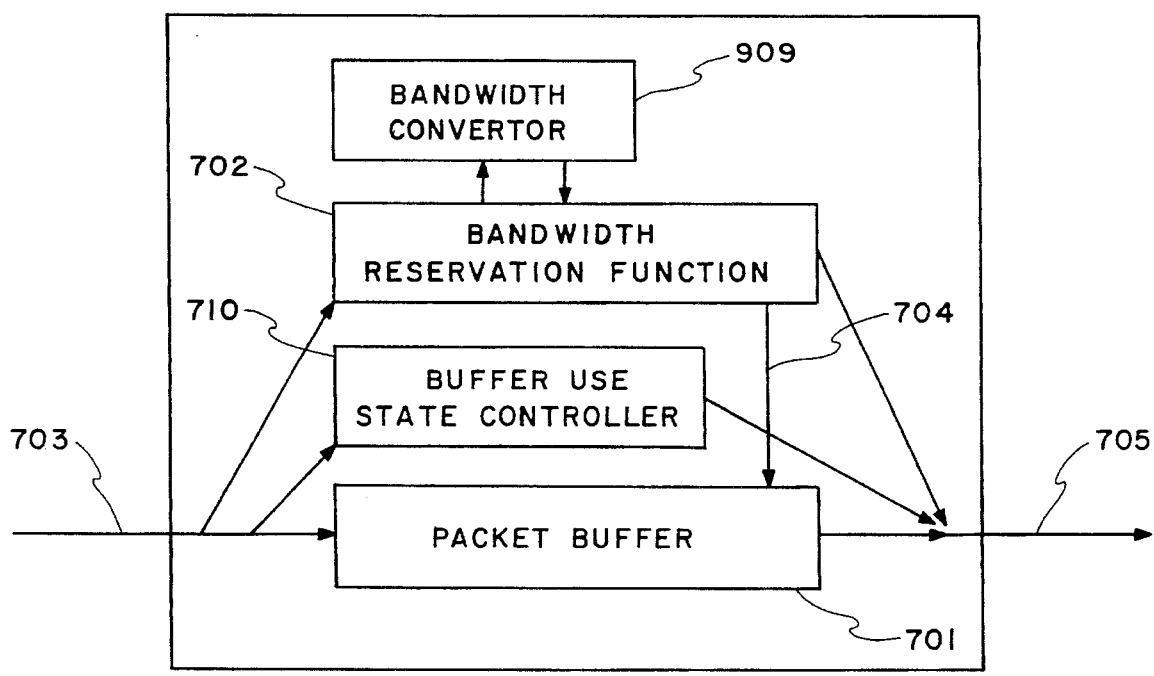
FIG. 11 is a block diagram showing the construction of a burst server with a bandwidth changing apparatus.

Further, it is also possible to modify the constructions of the first and second embodiments so that, when a bandwidth reservation request packet is to be sent from arbitrary burst server j (j is not equal to 0) in order to send message packet, to reserve a bandwidth the same size as or another bandwidth different from that of the bandwidth reserved by burst server h (h<j). FIG. 11 shows an example of a construction wherein the second embodiment is modified so that bandwidth changing function 909 for changing the bandwidth as described above is additionally provided for burst server 1. For example, when burst server 0 requests reservation of bandwidth B, if each of links 1, 2, 3 and 5 has a remaining bandwidth sufficient to reserve requested bandwidth B but only link 4 temporarily has an insufficient remaining bandwidth, the following communication can be performed using the bandwidth changing function. Burst server 0 first attempts and succeeds in reservation for link 1 using a bandwidth reservation request packet and then attempts and succeeds in reservation for link 2, whereupon it attempts and succeeds in reservation for link 3 and then attempts to reserve for link 4. The reservation unfortunately fails at link 4, and a reservation failure packet is sent to burst server 1 and the reservation for link 3 is also canceled. Burst server 1 now serves as a tentative receiving server, and burst server 0 and burst server 1 transfer message packet in bandwidth B using the reserved bandwidths of links 1 and 2. Thereafter, burst server 1 sets requested reserved bandwidth B' to B'<B, that is, reduces requested reserved bandwidth B', and attempts to make reservation of link 4 using a bandwidth reservation request packet. Since the requested bandwidth is smaller, the reservation for link 4 fortunately succeeds. Consequently, burst server 1 then attempts and succeeds in reservation for link 5. In this instance, the bandwidth reservation packet arrives at burst server 3, and a reservation success packet is sent from burst server 3 to burst server 1. Consequently, burst server 1 and burst server 3 transmit message packet in bandwidth B' using the reserved bandwidths of links 1 and 2.

Also in the first embodiment, a construction wherein a bandwidth changing function for changing the bandwidth is additionally provided for burst server 1 in a similar manner is possible.

Figure 12:
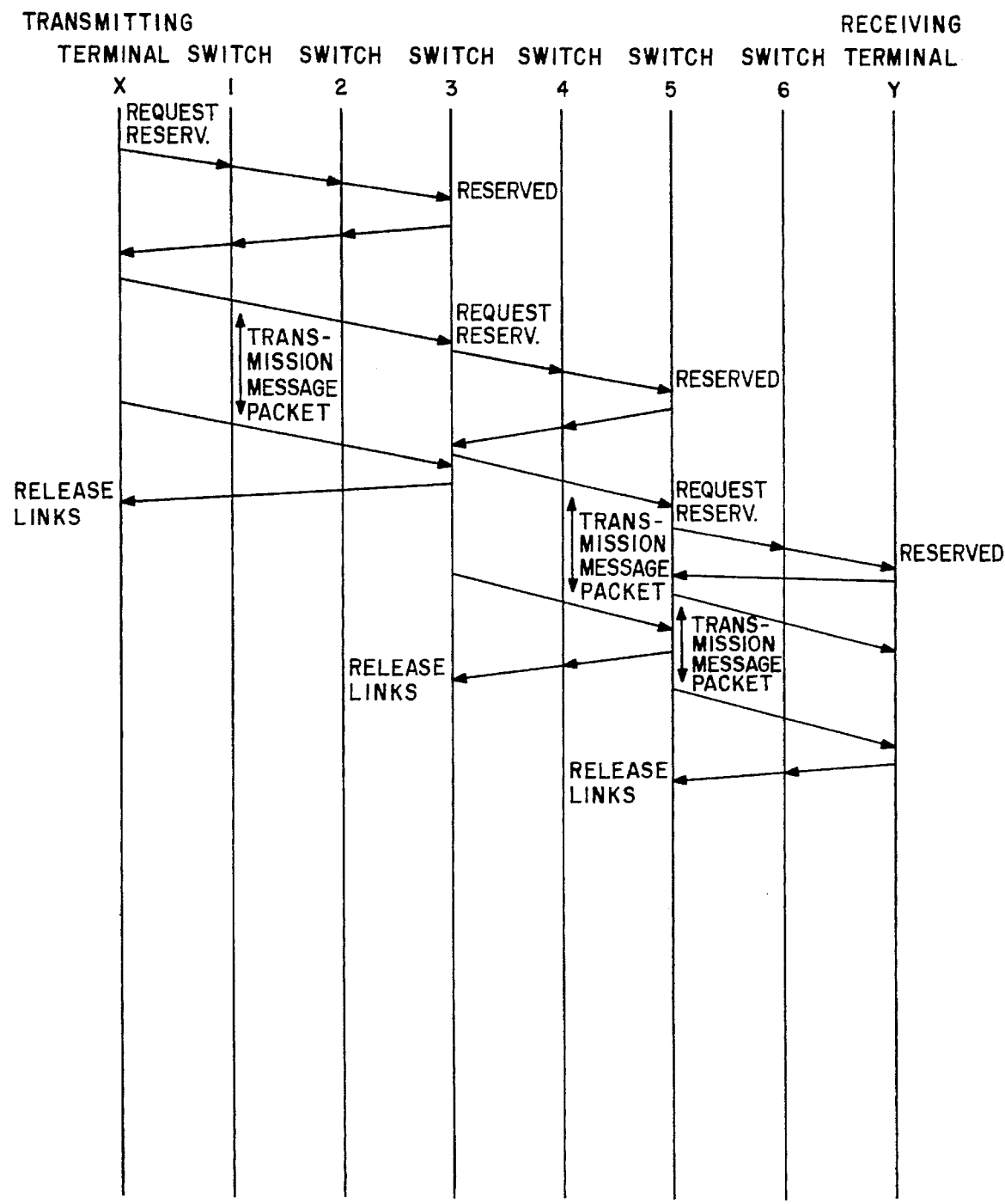
FIG. 12 is a diagram showing the sequence of transmission in the first embodiment in which the reservation request from a certain burst server to the next burst server is started before packet transmission to the certain burst server comes to an end.

Further, while, in the first and second embodiments described above, it is described with reference to FIGS. 4 and 5 that, after a transmission of a message packet to a burst server comes to an end, then another reservation request is started for another burst server, however, it also possible that another request of reservation is started for another burst server after the lapse of an arbitrary time immediately after a transmission of a message packet is starter without waiting until the message packet transmission comes to an end. FIGS. 12 and 13 are examples showing communication diagrams of the constructions of the first and second embodiments, respectively, which are modified so that another reservation request is started for another burst server after the lapse of an arbitrary time immediately after reception of the message packet described above.

In this manner, according to the present invention, since a burst server is employed, a message packet can be sent without the necessity that bandwidth reservation succeeds simultaneously at all of the links until a receiving terminal. In other words, it is possible to reduce K in the equation G=Kg which defines end to end block rate G described above under the Related Art. Accordingly, since block rate g of each link is fixed, a remarkable reduction of the end to end block rate can be anticipated. Further, since a message packet is actually sent to any link at which the reservation has succeeded, the utilization efficiency or throughput of the links of the entire network can be enhanced. Further, where the buffer capacity of a server for storing the message packet is small, loss of message packet by an overflow of the buffer can be eliminated by transmission of a message packet by taking advantage of the utilization condition of the buffer. Consequently, the situation that resending resulting from loss brings about an unnecessary increase of traffic of the network to cause congestion of the network and an increase of delay by resending degrades the quality of communication can be prevented.

What is claimed is:

1. A packet transmission method for a packet switching system, said packet switching system having at least one burst server interposed in a path extending between any transmitting terminal and a corresponding receiving terminal, message packets being transmitted through at least one link when said terminals are separated by at least two links, said burst server having a storage capacity adequate to store a received message packet, said system including means for requesting a reservation of free links on a basis of a required bandwidth and a sufficient storage capacity at the receiving burst server, and means for releasing the links after transmission of the message packet is completed; said method comprising:

performing a packet transmission on a basis of a reservation of a link having a necessary bandwidth through selected links and to a receiving burst server having a sufficient capacity for storing the message packet at the receiving end of said link, the message packet being sent from the transmitting terminal over reserved links to a furthest available burst server;

storing the receiving message packet at said furthest available burst server;

releasing the link between the transmitting terminal and the furthest available burst server after completing a transmission of the message packet;

performing a second packet transmission for transmitting the stored message packet from the furthest available burst server to a next furthest available burst server until the reservation is obtained;

storing the received message packet at each burst server when the message packet is received;

repeating said packet transmission for transmitting the stored message packet to the next furthest burst server until the consecutive reservation of free links is obtained and until the message packet is received at the receiving terminal; and repeating the release of the link used for transmitting the message packet after completing the transmission of the message packet at each concerned burst server consecutively until the message packet is received at the receiving terminal.

2. The packet transmission method for a packet switching system as claimed in claim 1, wherein the burst servers are provided on a fixed basis.

3. The packet transmission method for a packet switching system as claimed in claim 1, wherein each of the burst servers designates the next burst server in turn as to which a received message packet is transmitted.

4. The packet transmission method for a packet switching system as claimed in claim 1, wherein one of the burst servers which is connected to a subscriber exchange in which the transmitting terminal is accommodated provides the added step of designating the burst servers that are used.

5. The packet transmission method for a packet switching system as claimed in claim 1, wherein said method further comprises the step or restarting the link reservation request by converting the requested bandwidth to another available bandwidth when the request link reservation request is blocked.

6. The packet transmission method for a packet switching system as claimed in claim 1, wherein an inquiry of the storage capacity of the receiving side burst server at the request of said reservation is performed using a requested bandwidth reservation request packet.

7. The packet transmission method for a packet switching system as claimed in claim 1, wherein the method comprises the further step of notifying the current receiving storage capacity to at least adjoining burst servers so that they can recognize the current receiving storage capacity without inquiry.

8. A packet transmission apparatus for a packet switching system having at least one burst server interposed between a transmitting terminal and a receiving terminal, transmission being through at least one link when the terminals are separated by at least two links, said burst server comprising:

means for performing packet transmission which requires a reservation of a necessary bandwidth through relevant links and a sufficient storage capacity for storing the message packet at the furthest available burst server which is a first blocked burst server in a path including a plurality of burst servers;

means for storing a message packet as it is being receiving; and means for releasing the link used for transmitting the message packet responsive to a complete transmission and storage of the message packet at the burst server.

* * * * *